July 21, 1925.

C. L. COOK 1,546,624

PISTON PACKING

Filed June 25, 1923

2 Sheets-Sheet 1

Inventor
Charles Lee Cook
By
Attorney

July 21, 1925.
C. L. COOK
1,546,624
PISTON PACKING
Filed June 25, 1923     2 Sheets-Sheet 2
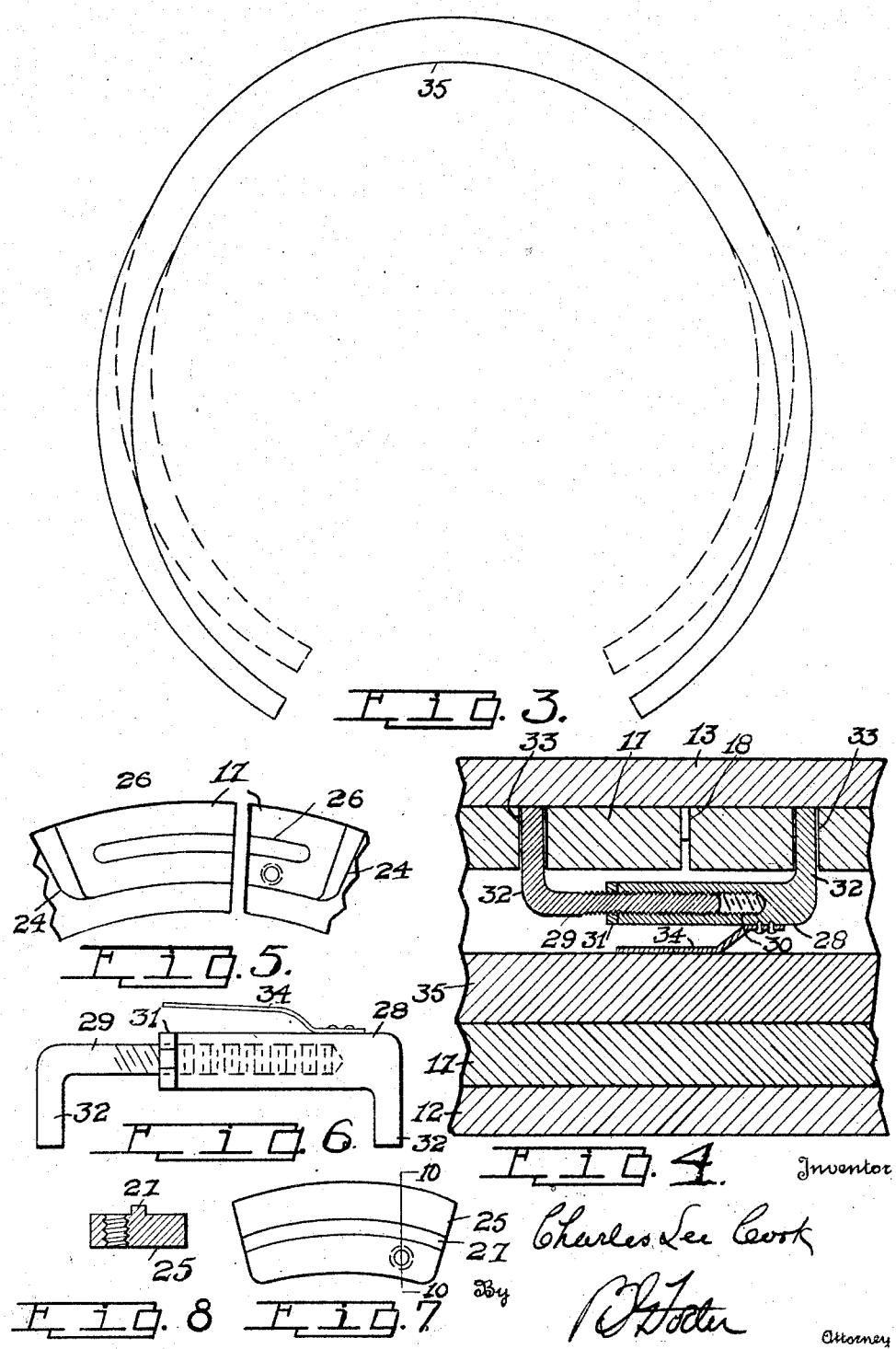

Patented July 21, 1925.

1,546,624

UNITED STATES PATENT OFFICE.

CHARLES LEE COOK, OF LOUISVILLE, KENTUCKY, ASSIGNOR TO C. LEE COOK MANUFACTURING COMPANY, OF LOUISVILLE, KENTUCKY, A CORPORATION OF KENTUCKY.

PISTON PACKING.

Application filed June 25, 1923. Serial No. 647,695.

*To all whom it may concern:*

Be it known that I, CHARLES LEE COOK, a citizen of the United States, residing at Louisville, in the county of Jefferson and State of Kentucky, have invented certain new and useful Improvements in Piston Packings, of which the following is a specification.

The present invention relates to piston rings, the object being to provide a simple structure that will not only provide an effective packing between the periphery of the piston and the cylinder wall, but also just as effectively will pack the joints necessarily formed between the piston and packing ring elements.

In the accompanying drawings:—

Figure 1:
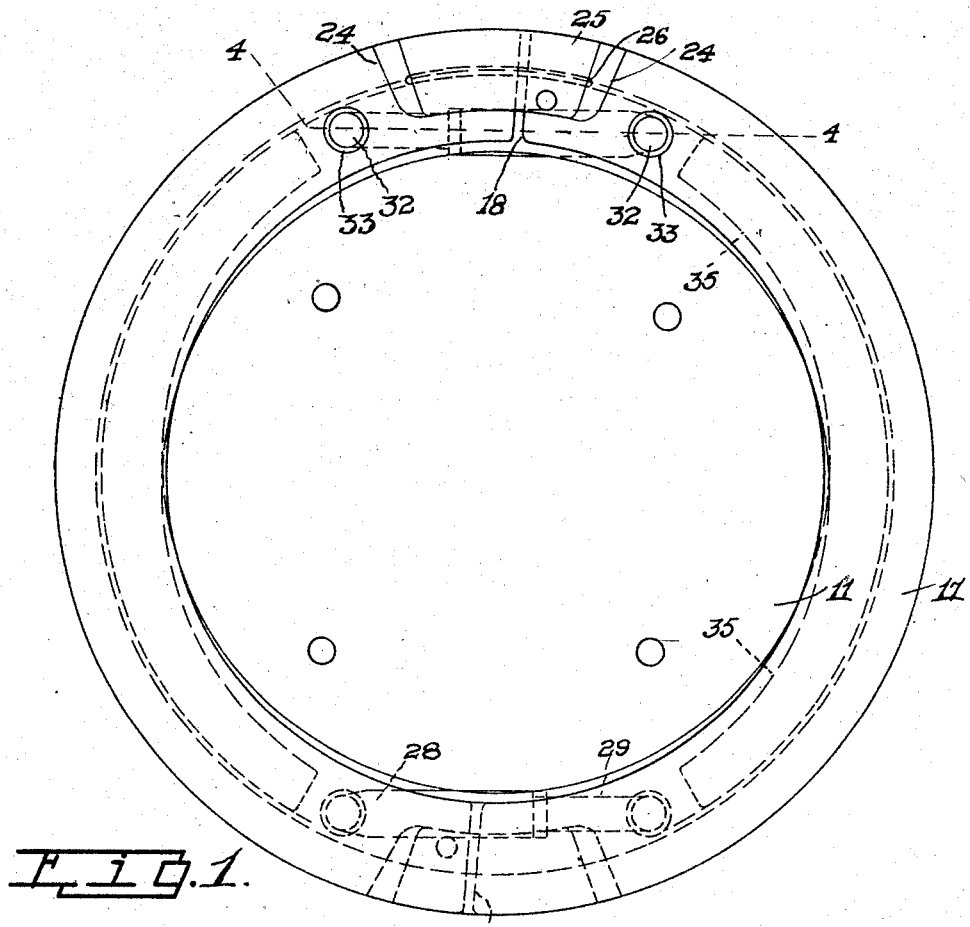
Figure 2:
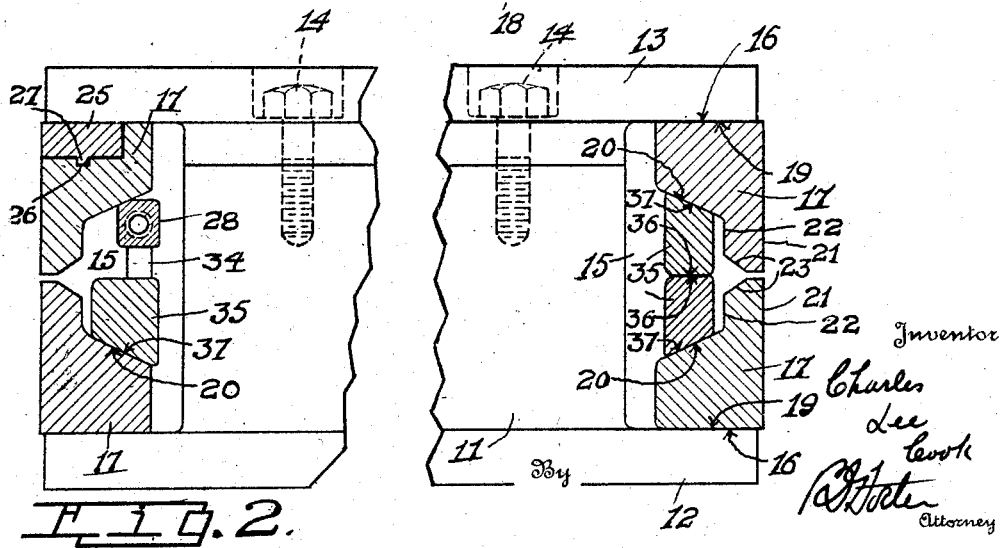

Figure 1 is a plan view of a piston having the improved packing and with the cap plate of said piston removed, Figure 2 is a vertical sectional view, Figure 3 is a plan view of the spreader rings, Figure 4 is a detail sectional view taken on the line 4—4 of Figure 1, Figure 5 is a plan view of the end portions of one of the packing rings, Figure 6 is a detail elevation of one of the tie elements between the ends of a packing ring, Figure 7 is a plan view of one of the bridge plates, Figure 8 is a cross sectional view on the line 10—10 of Figure 7.

In the embodiment disclosed the piston head is designated generally by the reference numeral 11, and has at one end an integral flange 12. A cap plate 13 is detachably secured to the other end of the head by screw bolts 14, or other suitable devices. Between said flange 12 and the peripheral portion of the cap plate 13 is thus formed an annular groove designated 15. The opposing inner side faces 16 of said groove are parallel.

In the said groove 15 are located a pair of packing rings designated generally by the reference numeral 17. They are of resilient metal and are split, as indicated at 18. The split portion of one is preferably diametrically opposite to the split portion of the other, as indicated in Figure 1. These rings have outer parallel faces 19 that slidably fit against the faces 16 of the groove walls. Their inner opposing faces have inner portions 20 that are convergently disposed and said rings have at the outer termination of said faces 20 oppositely extending flanges 21, the inner faces 22 of which constitute abutments. The inner ends of the flanges 21 preferably have convergent portions 23.

Each of these packing rings 17 has its terminal portions recessed as illustrated at 24, providing seats for a bridge plate 25, the outer edge of which corresponds to the curvature of the ring, said bridge plate being shorter than the combined seats 24 so as to allow the necessary expansion and contraction of the ring. Preferably the bottoms of the seats 24 have curved grooves 26 and the bridge plate is provided with a flange 27 engaged in the grooves. The amount of expansion and contraction of each ring is further limited by a tie element shown more particularly in Figures 3 and 6. This tie element consists of stems 28 and 29, one stem as 28 having a threaded bore 30 into which the other stem is adjustably screwed, a jamb nut 31 serving to hold the parts in adjusted relation. The stems 28 and 29 have offset terminals 32 that loosely engage in sockets 33 formed in the ends of the ring, and a spring 34, carried by one of the stems, as 28, serves to hold the terminal portions 32 in the sockets 33.

As shown clearly in Figure 2, the flanges 21 and the convergent portions 20 of the packing ring 17 produce an internal outwardly tapered annular groove, and in said groove are located spreader rings 35. These spreader rings, as illustrated in Figs. 1 and 3, are of resilient material and are segmental in character, preferably tapering from their central portions to their ends. They are arranged in reverse relation, or in other words, the ends of one are diametrically opposite to the ends of the other and said ends are spaced far enough apart to permit the tie element 28—29 between them, and at the same time allow sufficient play as indicated in Figure 1. The inner faces 36 of the rings 35 are parallel and slidably bear on each other. Their outer faces 37 are convergently disposed and their inclination corresponds to that of the faces 20 of the packing rings, against which they bear. These spreader rings 35 in their unrestricted condition are preferably greater in diameter than the peripheral diameter of the internal groove formed by the packing rings 17 and when said spreader rings are introduced they are contracted, as indicated in dotted lines in Figure 3.

Obviously therefore the spreader rings 35, due to their resilience and contracted condition are attempting to expand. As they are bearing against each other on parallel faces they are acting as a resilient wedge by reason of their inclined faces 37 bearing against the inclined faces 20 of the packing rings. The result is a separating pressure against the packing rings 17 that secures a tight packing fit between the outer faces 19 of the rings 17 and the wall faces 16 of the groove, but as the said rings 17 can slide on said faces 16, it will be obvious that a diametrical expansion is also secured by the spreader rings 35, insuring a proper fitting engagement between the peripheries of the packing rings 17 and the wall of the cylinder in which the piston is placed. As the spreader rings 35 are relatively stiff and somewhat difficult to introduce between the rings 17, the inclined portions 23 of the flanges 21 of the packing rings assist in the assembling.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. A piston having an annular groove, yielding packing rings in said groove having outwardly convergent opposing faces, a pair of yielding spreader rings interposed between the packing rings and having outer inclined faces corresponding substantially to and bearing against the inclined faces of the packing rings, said spreader rings being contracted within the compass of their normal unrestricted positions and serving to exert thrust against the packing rings diametrically and longitudinally of the piston, and said spreader rings having their ends spaced apart, and tie elements between the ends of the packing rings, for limiting the amount of their expansion, said elements being located in the space between the ends of the spreader rings.

2. A piston having an annular groove provided with substantially parallel side wall faces, split packing rings having outer substantially parallel faces that slidably bear against the side wall faces of the groove and inner opposite outwardly convergent faces, split spring spreader rings having opposing inner bearing faces and outer convergent faces that bear against the convergent faces of the packing rings, said spreader rings being contracted within the compass of their normal unrestricted positions and serving to exert thrust against the packing rings diametrically and longitudinally of the piston to urge said rings against the side wall faces of the groove and outwardly against the surrounding cylinder wall, the ends of the spreader rings being located farther apart than the ends of the packing rings and on opposite sides of the same, and said spreader rings having their ends spaced apart, and tie elements between the ends of the packing rings, for limiting the amount of their expansion, said tie elements being located in the space between the ends of the spreader rings.

3. A piston having an annular groove, provided with substantially parallel side wall faces, split packing rings having outer substantially parallel faces that slidably bear against the side wall faces of the groove and inner opposite outwardly convergent faces, said packing rings having oppositely extending flanges on their outer margins, split spring spreader rings having opposing inner bearing faces and outer convergent faces that bear against the convergent faces of the packing rings, said spreader rings being contracted within the compass of their normal unrestricted positions and serving to exert thrust against the packing rings diametrically and longitudinally of the piston to urge said rings against the side wall faces of the groove and outwardly against the surrounding cylinder wall, the peripheral portions of said spreader rings being spaced from the inner sides of the said flanges of the packing rings, the ends of the spreader rings being located farther apart than the ends of the packing rings and on opposite sides of the same, and said spreader rings having their ends spaced apart, and tie elements between the ends of the packing rings, for limiting the amount of their expansion, said tie elements being located in the space between the ends of the spreader rings.

4. A piston having an annular groove, packing in said groove including a split expansible ring member, and means for limiting the expansion of said ring member including adjustably telescoped tie element sections that bridge the joint between the ends of the ring member and have offset ends loosely engaged with said ends of the ring member, to permit limited expansion and contraction of the ring member.

5. A piston having an annular groove, packing in said groove including a split expansible ring member, and means for limiting the expansion of said ring member comprising stems adjustably threaded together and bridging the joint between the ends of the ring member, said ends having transverse sockets and said stems having offset terminals loosely engaged in the sockets.

In testimony whereof, I affix my signature in the presence of two witnesses.

CHARLES LEE COOK.

Witnesses:
F. D. DURHAM,
RUTH K. HASLETT.